US007660813B2

(12) United States Patent
Milic-Frayling et al.

(10) Patent No.: US 7,660,813 B2

(45) **Date of Patent: *Feb. 9, 2010**

(54) FACILITY FOR HIGHLIGHTING DOCUMENTS ACCESSED THROUGH SEARCH OR BROWSING

(75) Inventors: Natasa Milic-Frayling, Cambridge (GB); Ralph Sommerer, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/256,131

(22) Filed: Oct. 21, 2005

(65) Prior Publication Data

US 2006/0059138 A1 Mar. 16, 2006

Related U.S. Application Data

(63) Continuation of application No. 09/578,302, filed on May 25, 2000, now Pat. No. 6,968,332.

(51) Int. Cl.
*G06F 17/30* (2006.01)

(52) U.S. Cl. .............................. 707/102; 707/3; 707/5; 707/104.1

(58) Field of Classification Search ............... 707/1-10, 707/100-104.1, 200-205; 715/210
See application file for complete search history.

(56) References Cited

U.S. PATENT DOCUMENTS

| | | | | |
|---|---|---|---|---|
| 4,495,566 | A | | 1/1985 | Dickinson et al. |
| 5,278,980 | A | | 1/1994 | Pedersen et al. |
| 5,283,887 | A | * | 2/1994 | Zachery ...................... 715/210 |
| 5,404,514 | A | | 4/1995 | Kageneck et al. |
| 5,535,382 | A | | 7/1996 | Ogawa |

(Continued)

OTHER PUBLICATIONS

C. Olston and E.H. Chi. ScentTrails: Integrating Browsing and Searching on the Web. ACM Transactions on Computing, vol. 10 Issue 3, pp. 177-197, 2003.

(Continued)

*Primary Examiner*—Shahid A Alam
(74) *Attorney, Agent, or Firm*—Hope Baldauff Hartman, LLC

(57) ABSTRACT

An information highlighting facility assists the user in evaluating relevance of accessed documents to the user's information need. The accessed documents may, for example, be identified by a search engine in response to a user query. When accessing documents identified as relevant by a search engine from other networked computers, the facility provides information highlighting to assist the user in determining whether the document is relevant. A model of the user's interest, which may include an augmented set of search terms, is used to take into account the general interest of the user as captured by an interest profile and context of use of the computer by the user, or a combination thereof. The model of the user's interest is applied to the document text as the document is accessed from its source. The highlighting of information about the document content may include highlighting of the terminology in the text, scrolling of the document to the relevant passages, identification of entity names and entity relations, creation of a document summary and a document thumbnail, etc. In addition, the model can be applied to a set of documents accessed by the user, e.g., to re-rank the top scoring documents from the result set provided to the user by a search engine or some other information providing services.

10 Claims, 10 Drawing Sheets

U.S. PATENT DOCUMENTS 5,727,129 A 3/1998 Barrett et al.
5,864,871 A 1/1999 Kitain et al.
5,903,892 A * 5/1999 Hoffert et al. ................ 707/10
5,983,214 A * 11/1999 Lang et al. .................... 707/1
5,983,237 A * 11/1999 Jain et al. ............... 707/104.1
6,029,195 A 2/2000 Herz
6,052,108 A 4/2000 Gadd
6,055,542 A 4/2000 Nielsen et al.
6,101,503 A 8/2000 Cooper et al.
6,134,548 A 10/2000 Gottsman et al.
6,154,737 A 11/2000 Inaba et al.
6,233,586 B1 5/2001 Chang et al.
6,275,820 B1 8/2001 Navin-Chandra et al.
6,282,549 B1 * 8/2001 Hoffert et al. ........... 707/104.1
6,356,908 B1 3/2002 Brown et al.
6,363,377 B1 3/2002 Kravets et al.
6,369,811 B1 4/2002 Graham et al.
6,370,543 B2 * 4/2002 Hoffert et al. ........... 707/104.1
6,374,260 B1 * 4/2002 Hoffert et al. ........... 707/104.1
6,405,192 B1 6/2002 Brown et al.
6,408,294 B1 6/2002 Getchius et al.
6,473,730 B1 10/2002 McKeown et al.
6,473,751 B1 10/2002 Nikolovska et al.
6,473,752 B1 10/2002 Fleming, III
6,654,735 B1 11/2003 Eichstaedt et al.
6,665,838 B1 12/2003 Brown et al.
6,693,651 B2 2/2004 Biebesheimer et al.
6,728,706 B2 4/2004 Aggarwal et al.
6,874,019 B2 3/2005 Hamilton, II, et al.
6,968,332 B1 11/2005 Milic-Frayling et al.
7,567,953 B2 * 7/2009 Kadayam et al. .............. 707/3
2002/0165925 A1 11/2002 Hamilton, II et al.
2003/0014501 A1 1/2003 Golding et al.
2003/0023745 A1 1/2003 Noe

OTHER PUBLICATIONS

Anton Leuski. Relevance and Reinforcement in Interactive Browsing. Proceedings of the 9th International Conference on Information and Knowledge Management, pp. 119-126, 2000.
P. Baudisch, B. Lee, and L. Hanna. Fishnet, a Fisheye Web Browswer with Search Term Popouts: a Comparative Evaluation with Overview and Linear View. Proceedings of the Working Conference on Advanced Visual Interfaces, pp. 133-140, 2004.
OA Dated Aug. 22, 2008, for U.S. Appl. No. 11/255,512, 17 pages.
OA Dated Sep. 8, 2008, for U.S. Appl. No. 11/256,062, 24 pages.
OA Dated Jan. 27, 2009 for U.S. Appl. No. 11/255,512, 13 pages.
OA Dated Feb. 18, 2009 for U.S. Appl. No. 11/256,062, 22 pages.
U.S. Official Action dated Nov. 1, 2007 in U.S. Appl. No. 11/256,062.
U.S. Official Action dated Apr. 9, 2008 in U.S. Appl. No. 11/256,062.
U.S. Official Action dated Oct. 1, 2007 in U.S. Appl. No. 11/255,512.
U.S. Official Action dated Apr. 9, 2008 in U.S. Appl. No. 11/255,512.
U.S. Official Action dated Aug. 6, 2009 in U.S. Appl. No. 11/255,512.
U.S. Official Action dated Aug. 5, 2009 in U.S. Appl. No. 11/256,062.

* cited by examiner

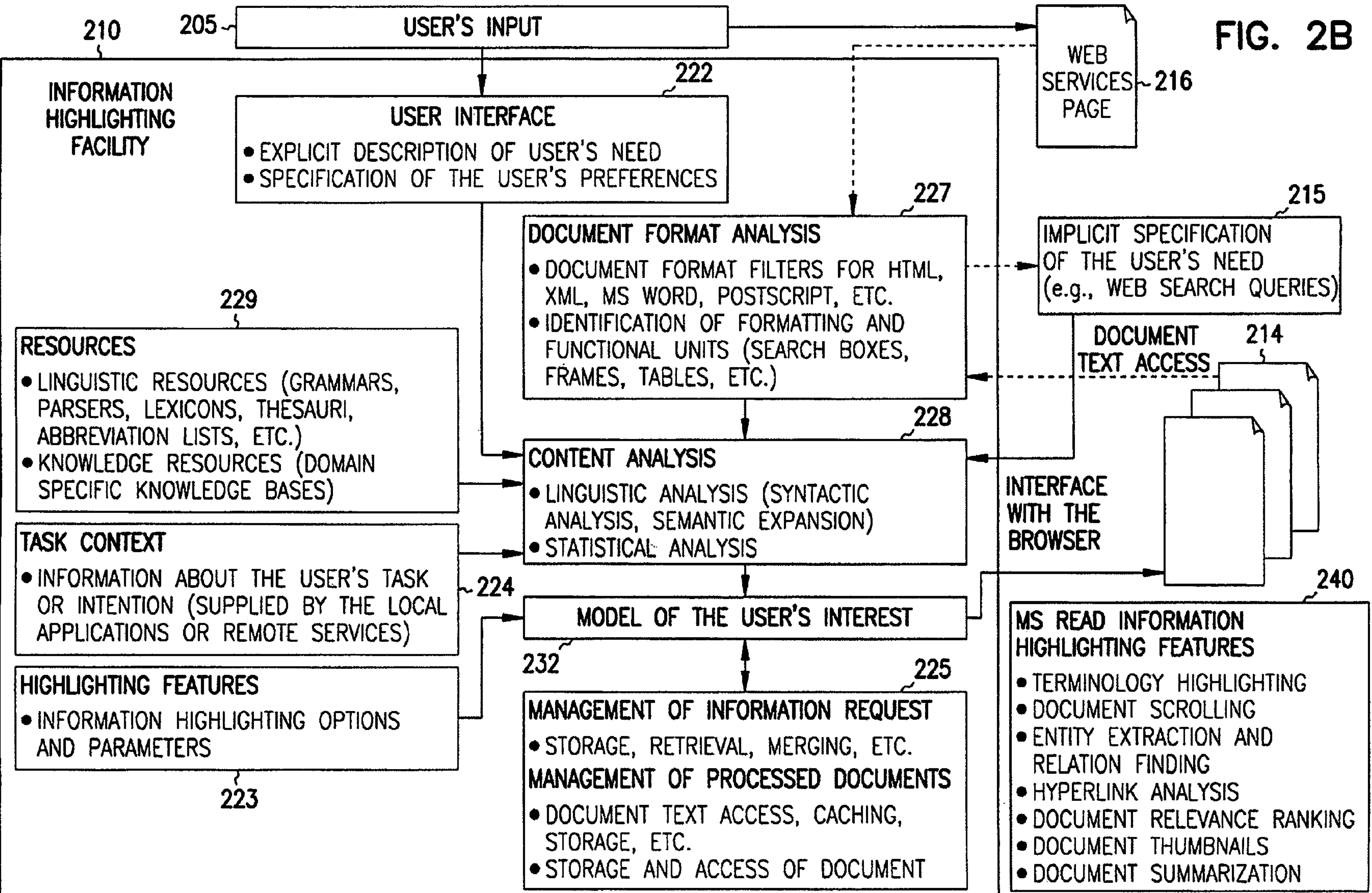
FIG. 2B
210
205
USER'S INPUT
WEB SERVICES PAGE
216
INFORMATION HIGHLIGHTING FACILITY
222
USER INTERFACE
• EXPLICIT DESCRIPTION OF USER'S NEED
• SPECIFICATION OF THE USER'S PREFERENCES
227
DOCUMENT FORMAT ANALYSIS
• DOCUMENT FORMAT FILTERS FOR HTML, XML, MS WORD, POSTSCRIPT, ETC.
• IDENTIFICATION OF FORMATTING AND FUNCTIONAL UNITS (SEARCH BOXES, FRAMES, TABLES, ETC.)
215
IMPLICIT SPECIFICATION OF THE USER'S NEED (e.g., WEB SEARCH QUERIES)
DOCUMENT TEXT ACCESS
214
229
RESOURCES
• LINGUISTIC RESOURCES (GRAMMARS, PARSERS, LEXICONS, THESAURI, ABBREVIATION LISTS, ETC.)
• KNOWLEDGE RESOURCES (DOMAIN SPECIFIC KNOWLEDGE BASES)
228
CONTENT ANALYSIS
• LINGUISTIC ANALYSIS (SYNTACTIC ANALYSIS, SEMANTIC EXPANSION)
• STATISTICAL ANALYSIS
INTERFACE WITH THE BROWSER
TASK CONTEXT
• INFORMATION ABOUT THE USER'S TASK OR INTENTION (SUPPLIED BY THE LOCAL APPLICATIONS OR REMOTE SERVICES)
224
MODEL OF THE USER'S INTEREST
232
240
MS READ INFORMATION HIGHLIGHTING FEATURES
• TERMINOLOGY HIGHLIGHTING
• DOCUMENT SCROLLING
• ENTITY EXTRACTION AND RELATION FINDING
• HYPERLINK ANALYSIS
• DOCUMENT RELEVANCE RANKING
• DOCUMENT THUMBNAILS
• DOCUMENT SUMMARIZATION
HIGHLIGHTING FEATURES
• INFORMATION HIGHLIGHTING OPTIONS AND PARAMETERS
223
225
MANAGEMENT OF INFORMATION REQUEST
• STORAGE, RETRIEVAL, MERGING, ETC.
MANAGEMENT OF PROCESSED DOCUMENTS
• DOCUMENT TEXT ACCESS, CACHING, STORAGE, ETC.
• STORAGE AND ACCESS OF DOCUMENT

FACILITY FOR HIGHLIGHTING DOCUMENTS ACCESSED THROUGH SEARCH OR BROWSING

CROSS-REFERENCE TO RELATED APPLICATIONS

This application is a continuation of U.S. Pat. No. 6,968,332, filed on May 25, 2000, and entitled, "FACILITY FOR HIGHLIGHTING DOCUMENTS ACCESSED THROUGH SEARCH OR BROWSING." This application is also related to co-pending U.S. Divisional patent application Ser. No. 11/255,512, filed Oct. 21, 2005, entitled, "FACILITY FOR HIGHLIGHTING DOCUMENTS ACCESSED THROUGH SEARCH OR BROWSING" and co-pending U.S. Divisional patent application Ser. No. 11/256,062, filed Oct. 21, 2005, and entitled, "FACILITY FOR HIGHLIGHTING DOCUMENTS ACCESSED THROUGH SEARCH OR BROWSING". The entireties of the aforementioned applications are incorporated herein by reference.

FIELD OF THE INVENTION

This invention relates generally to the field of computers, and in particular to enhancing query results provided by a search engine.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright© 2000, Microsoft Corporation, All Rights Reserved.

BACKGROUND

The World Wide Web (WWW), often referred as the Web, is a fast growing network that involves a vast quantity of data and numerous types of services aimed at accessing, organizing, and distributing that data. In particular, there are millions of documents on the Web and many on-line search services that enable the users to find documents that are of interest to them.

Furthermore, documents on the Web are linked via hyperlinks, created by the authors of the documents, which enable the users to browse through documents on their own by following the links that interest them.

The large quantity of the Web data and the fast rate of Web expansion have imminent implications on the ways the services on the Web can approach the problem of processing Web data.

Collecting and processing all or a majority of Web documents with an appropriate rate of updating the information that has been collected about these documents is often not feasible. Indeed, the processing power and the network bandwidth are not yet up to the task. However, there is also a more fundamental reason: because of the distributed nature of the data, the services are not in control of the document change—the authors of Web documents can change them at any time, as needed. That is why, among other reasons, search engines do not deliver the document text in response to the user's query. The search engines at best deliver the title and some type of summary of a document that is created by the search engine based on the version of the document available at the time the document was collected and indexed. The search engine points the user to the URL, i.e., the location of the document on the Web at the time the document was collected. It is up to the user then to execute the URL link and access the document text, which may or may not be the same as the text processed and summarized by the search engine.

This lack of control over the content of documents on the Web requires new approaches in providing some of the basic and commonly provided document management features of traditional document management systems. Such features include: marking of the query terminology in the document text to help the user identify the portions of the text that talk about the desired topic, to assess the document relevance to the topic, etc.; summarizing document text to extract most salient sentences or query specific portions of the text; analyzing the text to identify and extract entities that may be of particular interest to the user, e.g., person names, company names, locations, etc., or relations among these entities; creating various visual representations of the document to help with browsing through the document, assessing document relevance, etc.

Since the documents on the Web are frequently accessed in the browsing mode by following the hyperlinks in the documents, the same type of document management support is needed for browsing among and through Web documents.

Furthermore, since the type and the quality of services on the Web vary, the users on the Web often need to explore which of them can handle best a particular request for information. For example, if the user is engaging a couple of search engines to find certain types of documents, this often involves retyping the query in the appropriate search window of the individual search engines. There is a need for a facility that can assist the user in specifying the user's information need and that creates various representations of that need suitable for interfacing with various Web services.

In summary, there is a need to provide the user with the facilities for obtaining better information regarding the relevancy of documents pointed to by various services on the Web or accessed by browsing the Web documents. There is a further need to provide such information based on the current versions of the documents. There is still a further need to provide the user with a consistent manner in which such relevancy is identified regardless of the way the document is accessed (based on Web service information or browsing or the combination of). There is yet a further need to provide a rich representation of the user's information need.

SUMMARY OF THE INVENTION

An information highlighting facility on a computer assists the user in searching, browsing, and reading documents on the Web or similar distributed network environments. When the user downloads a document from the Web, e.g., by following a hyperlink while browsing the Web or by choosing one of the documents that a search engine (or some other Web service) found relevant to a previously issued query, the information highlighting facility provides information to assist the user in determining whether the document is of interest to the user. The facility matches the document text with a model of the user's information need that has been created by the facility (independently from the services that the user is using on the Web) and supports a number of document analyses.

In the case of search, the document text is analyzed with respect to the user's specified information need. In this instance, the assistance in assessing the document relevance may be provided by marking keywords or key phrases within documents to make them easier to spot, by scrolling to what seems to be the most relevant portion of the document, etc., or by combinations thereof. Additional assistance can be by extracting specified features from the document such as company names, person names, location names, etc., by summarizing documents in view of the user's query, by constructing thumbnail images of documents with query terms highlighted, etc. Furthermore, the facility can provide alternative ranking of documents pointed to by the search engine on the basis of the richer representation of the user's need that the facility created. That can be achieved by pre-fetching, analyzing, and re-ranking a selection of documents that were originally pointed to by the search engine.

In the case of browsing, for example, the user can specify in advance or at the time the document is accessed, a perspective from which the user wants the document to be analyzed. For example, the user can provide the information highlighting facility with a description of the topic the user is interested in or other criteria for analyzing documents (e.g., a format specification of the document). This description of the user's preferences can be applied to analyze the accessed documents (currently and subsequently) as well as used to give a relevance assessment of the documents pointed to by the hyperlinks in the currently viewed document. Relevance assessment of hyperlinks could be achieved, for example, by downloading and analyzing the linked documents in the background and providing the user with the qualitative characterization of the links.

To assist the user in reading and assessing the documents, the information highlighting facility creates a description or a model of the user's need or interest. This model is used as the basis for various document analyses. Model may include, but is not limited to, descriptions of queries that the user is sending to search engines on the Web, a general 'profile of interest' that the user specified (e.g., by means of a dialog), the augmented versions of these descriptions that the highlighting facility created based on further linguistic and/or semantic analysis, or additional information that the highlighting facility may collect or infer about the user's current task. The user may also request some generic types of analysis to be applied, e.g., extraction of certain types of entity names or entity relations that may be contained in the document. This model of the user interest serves as a context for the analysis of the accessed or pre-fetched documents.

The processing required for the construction of the model can be done locally using facilities on the user's computer, or as an external service (e.g., at a dedicated server on the network), or as a combination of the two. Furthermore, the model construction can be done simultaneously and independently from the other services that the user is using on the Web (e.g., search engines).

The information highlighting facility applies the model to the documents that are accessed by the user, or if required for some types of analysis, by pre-fetching the documents in the background. The results of the various analyses are presented appropriately (by inserting mark ups in the document, extracting information into separate windows, or creating various other visual representations).

The facility also provides support for managing various user interest models and applying them by the user as needed both for document analysis and for interfacing with other Web services (e.g., the user can simply point to the portion of the model representation that needs to be sent to a particular Search service as a query).

The principles on which the information highlighting facility is built allow for incorporation of various types of document analysis. For example, it can include but is not limited to: terminology marking, scrolling, re-ranking, document thumbnailing, summarization and link analysis.

BRIEF DESCRIPTION OF THE DRAWINGS

FIG. 2B is a block flow diagram of a service for creating a model of the user's interest and management of documents and document requests.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into multiple sections. A first section describes the operation of a computer system which implements the current invention. This is followed by a high level description of the invention, including how the model of the user's interest is generated and used. Further embodiments are then described, including re-ranking of documents and extracting and generating information from the documents to further assist the user in reading and assessing the accessed documents.

HARDWARE AND OPERATING ENVIRONMENT

Figure 1:
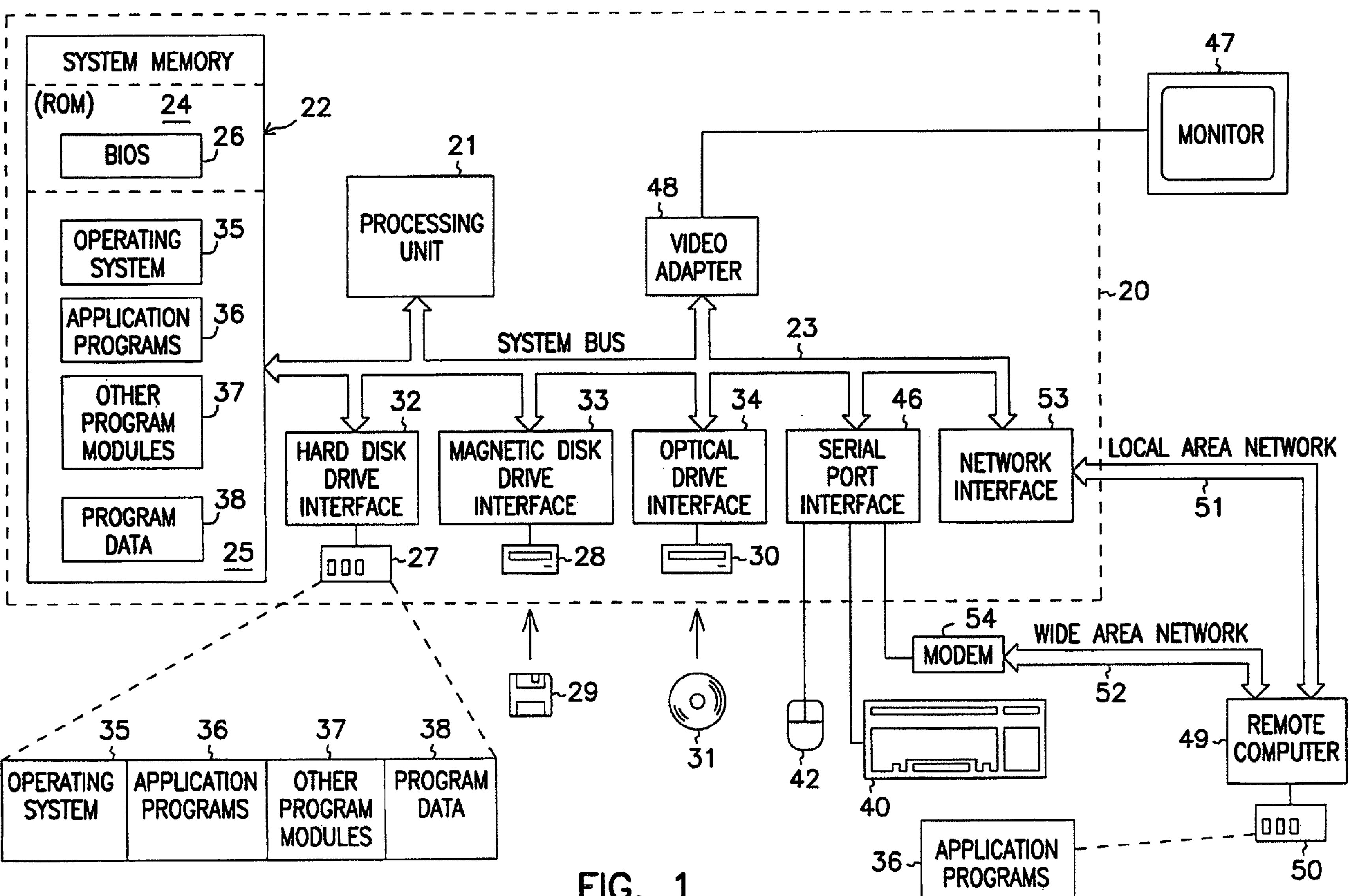
FIG. 1 is a block diagram of a computer system on which the present invention may be implemented.

FIG. 1 provides a brief, general description of a suitable computing environment in which the invention may be implemented. The invention will hereinafter be described in the general context of computer-executable program modules containing instructions executed by a personal computer (PC). Program modules include routines, programs, objects, components, data structures, etc. that perform particular tasks or implement particular abstract data types. Those skilled in the art will appreciate that the invention may be practiced with other computer-system configurations, including hand-held devices, multiprocessor systems, microprocessor-based programmable consumer electronics, network PCs, minicomputers, mainframe computers, and the like which have multimedia capabilities. The invention may also be practiced in distributed computing environments where tasks are performed by remote processing devices linked through a communications network. In a distributed computing environment, program modules may be located in both local and remote memory storage devices.

FIG. 1 shows a general-purpose computing device in the form of a conventional personal computer 20, which includes processing unit 21, system memory 22, and system bus 23 that couples the system memory and other system components to processing unit 21. System bus 23 may be any of several types, including a memory bus or memory controller, a peripheral bus, and a local bus, and may use any of a variety of bus structures. System memory 22 includes read-only memory (ROM) 24 and random-access memory (RAM) 25. A basic input/output system (BIOS) 26, stored in ROM 24, contains the basic routines that transfer information between components of personal computer 20. BIOS 26 also contains start-up routines for the system. Personal computer 20 further includes hard disk drive 27 for reading from and writing to a hard disk (not shown), magnetic disk drive 28 for reading from and writing to a removable magnetic disk 29, and optical disk drive 30 for reading from and writing to a removable optical disk 31 such as a CD-ROM or other optical medium. Hard disk drive 27, magnetic disk drive 28, and optical disk drive 30 are connected to system bus 23 by a hard-disk drive interface 32, a magnetic-disk drive interface 33, and an optical-drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disk 31, those skilled in the art will appreciate that other types of computer-readable media which can store data accessible by a computer may also be used in the exemplary operating environment. Such media may include magnetic cassettes, flash-memory cards, digital versatile disks, Bernoulli cartridges, RAMs, ROMs, and the like.

Program modules may be stored on the hard disk, magnetic disk 29, optical disk 31, ROM 24 and RAM 25. Program modules may include operating system 35, one or more application programs 36, other program modules 37, and program data 38. A user may enter commands and information into personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial-port interface 46 coupled to system bus 23; but they may be connected through other interfaces not shown in FIG. 1, such as a parallel port, a game port, or a universal serial bus (USB). A monitor 47 or other display device also connects to system bus 23 via an interface such as a video adapter 48. In addition to the monitor, personal computers typically include other peripheral output devices (not shown) such as speakers and printers.

Personal computer 20 may operate in a networked environment using logical connections to one or more remote computers such as remote computer 49. Remote computer 49 may be another personal computer, a server, a router, a network PC, a peer device, or other common network node. It typically includes many or all of the components described above in connection with personal computer 20; however, only a storage device 50 is illustrated in FIG. 1. The logical connections depicted in FIG. 1 include local-area network (LAN) 51 and a wide-area network (WAN) 52. Such networking environments are commonplace in offices, enterprise-wide computer networks, intranets and the Internet.

When placed in a LAN networking environment, PC 20 connects to local network 51 through a network interface or adapter 53. When used in a WAN networking environment such as the Internet, PC 20 typically includes modem 54 or other means for establishing communications over network 52. Modem 54 may be internal or external to PC 20, and connects to system bus 23 via serial-port interface 46. In a networked environment, program modules, such as those comprising Microsoft® Word which are depicted as residing within PC 20 or portions thereof may be stored in remote storage device 50. Of course, the network connections shown are illustrative, and other means of establishing a communications link between the computers may be substituted.

Software may be designed using many different methods, including object oriented programming methods. C++ and Java are two examples of common object oriented computer programming languages that provide functionality associated with object-oriented programming. Object oriented programming methods provide a means to encapsulate data members (variables) and member functions (methods) that operate on that data into a single entity called a class. Object oriented programming methods also provide a means to create new classes based on existing classes.

An object is an instance of a class. The data members of an object are attributes that are stored inside the computer memory, and the methods are executable computer code that act upon this data, along with potentially providing other services. The notion of an object is exploited in the present invention in that certain aspects of the invention are implemented as objects in one embodiment.

An interface is a group of related functions that are organized into a named unit. Each interface may be uniquely identified by some identifier. Interfaces have no instantiation, that is, an interface is a definition only without the executable code needed to implement the methods which are specified by the interface. An object may support an interface by providing executable code for the methods specified by the interface. The executable code supplied by the object must comply with the definitions specified by the interface. The object may also provide additional methods. Those skilled in the art will recognize that interfaces are not limited to use in or by an object oriented programming environment.

INVENTION OVERVIEW

Figure 2A:
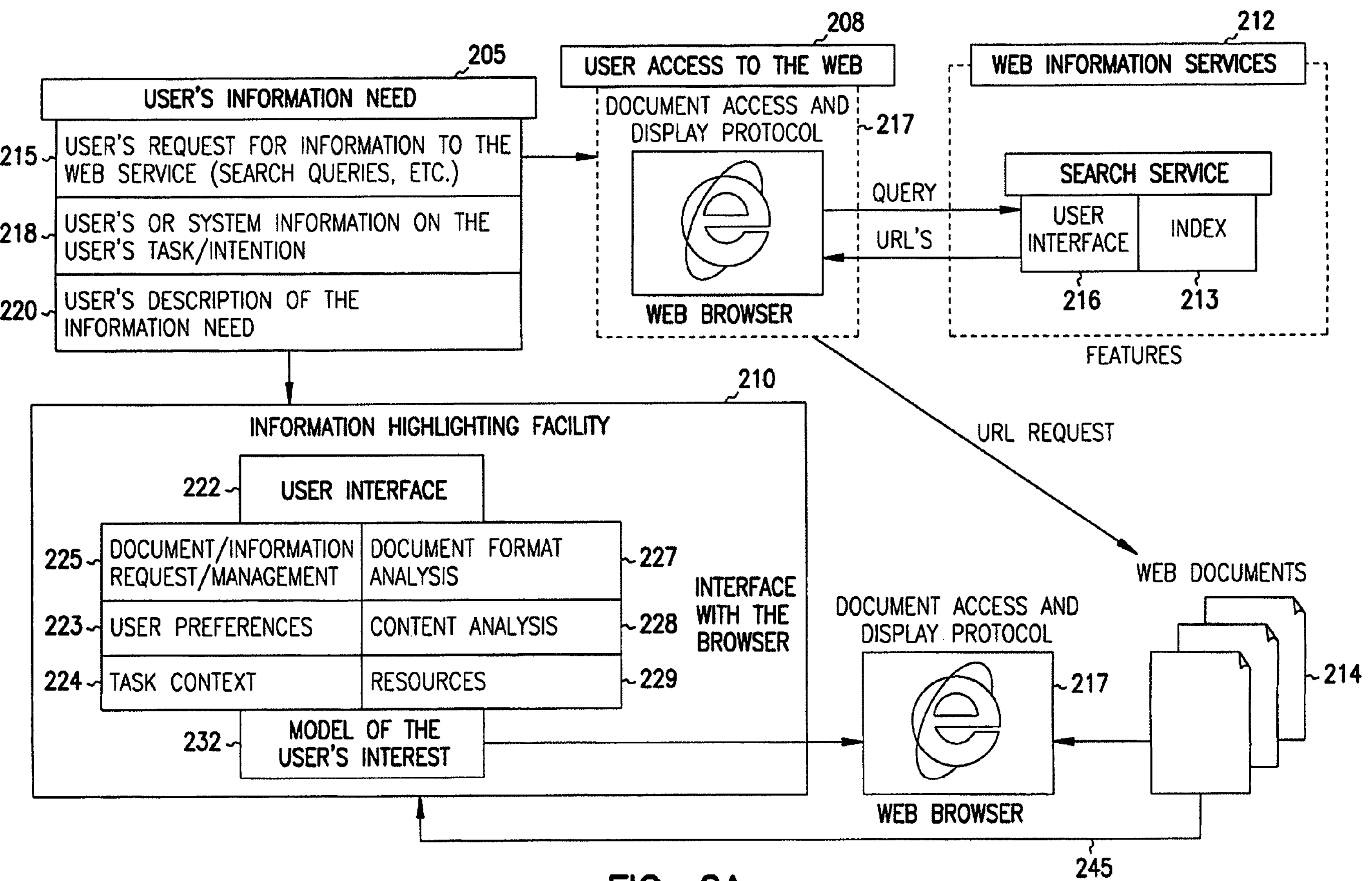
FIG. 2A is a block flow diagram showing interaction of the present invention with a Web based information service (e.g., a search engine) and browser.

A block flow diagram of operation of the invention is shown in FIG. 2A generally at 200. An information highlighting facility is designated as Information highlighting facility 210 as shown in FIGS. 2A and 2B. The term highlighting facility refers to multiple functions used to highlight the relevancy of one or more documents as described below. It is not meant to be a term that refers only to the common function of highlighting text. The information highlighting facility also includes a document analysis facility to analyze documents prior to applying highlighting functions.

A user's information need is represented at 205 in FIG. 2A. The need is communicated to a means of accessing the web, such as a web browser 208, and to an information highlighting facility 210. The information highlighting facility 210 creates a model of the user's information need that is more or less independent of the expression of the user's information need that is communicated by the user to a particular information providing service 212 (e.g., search engines on the Web). The information providing service 212 also comprises an index 213 that identifies documents 214 by means of an address or URL from which a web browser 217 may retrieve and display documents. Documents may also be provided directly to the information highlighting facility 210.

Input to the information highlighting facility 205 can be, for example, a single query or a set of queries 215 communicated by the user to the Web information providing service 212 (e.g., queries to a Search engine). These queries are in one embodiment captured from the Web page of a search engine at the time the user types a query into the search box provided by a user interface 216. This is referred to as an implicit characterization of the user's information need since it was not directly communicated to the information highlighting facility 210, but rather captured by the information highlighting facility 210 by monitoring the user's actions. Similarly, the system used by the user can monitor user's actions and provide information on the task the user is performing 218 (e.g., working on a report, sending an e-mail message, etc.) as a context for the information highlighting facility analysis to create the model of the user's information need.

In another embodiment the information highlighting facility provides a query box that serves the purpose of specifying the query. The specified query is then sent (copied and pasted, dragged and dropped) to the search box 216 of a desired search engine. The user is then not required to retype the query when changing from one search engine to another.

Another, more explicit way of providing information highlighting facility 210 with the characterization of the user's need is by using a user's specification of the task and intentions at 218 (for example, in a form of a dialogue with information highlighting facility 210) and/or the user's detailed description of the information need at 220 (a direct input to information highlighting facility 210). Note, parts or all of the full description of the user's need are then useable for communicating with a particular information providing service (e.g., a search engine to information directory on the Web).

Information highlighting facility 210 is provided with a GUI 222 (graphical user interface) that enables direct input from the user. In particular, the user may specify a desired type of information highlighting facility 210 analysis that should be applied to the viewed documents, with details on the parameters to be used in the analysis (when required) and preferences on the display of results as indicated at 223. Furthermore, the user may provide information on a particular task the user is currently performing as represented at 224 to ensure that the analyses are context sensitive when applicable.

Information highlighting facility 210 contains a module 225 for managing past requests for information analysis (e.g., storing, retrieving, concatenating queries and information need descriptions) and/or documents that have been downloaded and analyzed.

Information highlighting facility 210 analyses typically involve three components: format recognition and analysis module 227, content analyses 228 (e.g., linguistic and statistical analysis of the text), and resources 229 required for the analyses (e.g., linguistic and knowledge resources for identifying company names in the text).

The user specifies the information need 205 to information highlighting facility 210 directly or indirectly by communicating it to the Web information providing service 212. The system or the user may also provide information on a task that the user is currently performing. The user also specifies the type of information highlighting facility analysis that should be performed on the accessed documents.

This request for information is communicated via Web browser 217 to the information providing service. As a result, the user is provided with URL's and perhaps some additional information about documents that potentially satisfy the user's information need. For example, in case of Web search engines, the result of a search is typically a ranked list of document titles with short summaries and URL's.

Based on the task context 224 and the specification of the user's information need, information highlighting facility 210 creates a model of the user's information need represented at 232.

FIG. 2B provides further information about process flow of the invention. The numbering of modules is consistent with FIG. 2A. Information highlighting facility 210 provides several features to enhance or highlight documents as indicated at 240. Such features may include terminology highlighting, document scrolling, entity extraction and relation finding, hyperlink analysis, document relevance ranking, document thumbnails, and document summarization.

As an example of the process flow, if the user desires to have relevant terminology from the information request highlighted in the accessed documents, information highlighting facility 210 processes the request for information using linguistic analysis tools 228 and knowledge resources 229 to create a rich model 232 of the topic of interest. For example, it may perform synonym expansion of the original terms in the information request to ensure that relevant information is highlighted in the document without the need for the user to try to anticipate the linguistic variations in which the topic is described in the text.

As the user accesses a document, the model of the user's information need is used in the analysis of the document. For example, terminology highlighting is achieved by detecting in the document text (e.g., pattern matching) the terminology from the rich linguistic representation of the user's information need created by information highlighting facility 210. The user can specify various parameters related to terminology highlighting at 223. For example, the user may prefer to have terminology from the original description of the information need highlighted in one color while all the synonyms in some other color. Or, perhaps, the user may want only the occurrence of multi-word phrases from the request highlighted in the document, etc.

Some types of information highlighting facility analysis may require pre-fetching the document text in the background as the user is performing other tasks, e.g., viewing the result list from the search engine. For example, suppose that the user requested that thumbnail images of documents that were indicated by the search engine be displayed with query terminology highlighted in them. In that case, the text of documents from the search result page being viewed by the user could be downloaded in the background as represented by communication line 245, analyzed for query terminology and document layout and the highlighted thumbnail images would be displayed.

Similarly, suppose that the user requested an alternative ranking of the search result based on the rich information highlighting facility representation of the user's need (as oppose to the short query that the user may have communicated to the search engine). The document text of some selected documents (e.g., top N ranked documents) could be pre-fetched in the background, linguistically and statistically processed, and compared with the information highlighting facility 210 model of the user's interest. The documents would be scored and alternative ranking of them presented to the user.

Many of the information highlighting facility 210 analyses could be equally applied to the documents accessed as the user is browsing through the documents.

Information highlighting facility 210 may be implemented as a local service on the user's desktop or as a remote service, or can be a combination of the two. For example, some information highlighting facility 210 analyses could employ the locally available resources (e.g., thesauri or knowledge base that the user may have available locally).

When applied as a remote service (and thus used by a number of users), information highlighting facility 210 could benefit from the information it may store on the user community. For example, it may store some types of analysis of documents that have been performed as a result of the users' requests within a certain period of time (e.g., an hour, or a day, etc.).

For example if a user A requested that the accessed documents be analyzed for company names and person names, information highlighting facility 210 can perform this analysis and store the analysis results. When a user B accesses the same document and asks for the same analysis the results could be delivered without repeating the document analysis (and thus saving the processing time).

As indicated above, information highlighting facility 210 captures information about the user's need. This can be done, in one embodiment, based on the queries that the user issues to the Web Search engines or different Web services at the service Web site. It can also be based on the user's description of the user's interest or information need communicated directly to information highlighting facility 210 through the information highlighting facility interface 222. Furthermore, the information highlighting facility 210 may make inferences or collect from the user explicitly (e.g., through a dialog) information about the user's task or intentions or preferences about the characteristics of documents (e.g., format of the documents that the user wants to access or avoid) or similar.

Based on the collected information, the information highlighting facility 210 builds the representation or model of the user's interest. This model then provides a context for analysis and information highlighting of any document accessed by the user. In one embodiment these are the documents downloaded from the Web. However, information highlighting facility 210 can be extended with components that recognize formats of documents from various sources (e.g., documents created by applications running locally on the user's desktop, documents delivered via e-mail, etc.). All information highlighting facility 210 features could then be applied to the content of those documents and the results displayed appropriately.

Users may access documents by directly executing a URL of the desired document via the browser 217 or may follow a hyperlink in the currently viewed document or may select to access documents from a list of URLs presented to the user by a Web service (Search or others) as a result of the user's request for information.

As the documents are downloaded by the browser 217 they are processed by the information highlighting facility 210 in view of the model of the user's interest. The results of the information highlighting facility 210 processing are then displayed appropriately to the user. Information highlighting facility 210 may include a number of different features and supporting analyses comprising but not limited to: marking of terminology in the text, scrolling to the relevant passages in the document, extracting specified entity names and relations among entities in the text, summarizing documents by selecting sentences salient to the content of the document, or related to the query, etc., ranking documents in a designated document set with respect to the information highlighting facility 210 representation of the user's need, analyzing hyperlinks in the viewed documents with respect to the user's need, and creating various visual representations of the documents, such as thumbnail document images with highlighted information in the document text and hyperlinks to support reading of and browsing through the document text.

The information highlighting facility 210 provides support for storing and managing various models of the user's interests. In particular it enables the user to select which of the existing models or combination of the existing models should be used as the context for the analysis of documents.

If the user wishes to engage Search or similar Web services for information seeking the user's queries or parts of the comprehensive information highlighting facility 210 model of the user's interest 232 are sent via browser 217 such as Internet Explorer for processing by the service 212. The user interface 216 running on the service end receives queries and performs the search operation over the documents that have been collected and processed by the service. Typically the services store information about the documents, including the document URL (uniform resource locator) in the form of index 213. As a result of the query processing, document identifiers, such as URLs, are retrieved from the index and typically ranked in relevance to the queries. The URLs are sent back to the client.

In one embodiment, the user's interest model is generated by analyzing the query terms as entered by the user in 216. This may involve creating an augmented set of search terms based on syntactic analysis and semantic expansion of the user's query. The information highlighting facility 210 then provides highlighting of the original and expanded query terminology in the documents accessed upon the user request (via document identifier, the URL). Furthermore, the information highlighting facility 210 may use information about the wider context, e.g., the user task or user's explicit preferences to perform the terminology highlighting appropriately. For example, to support more efficient reading of the document, information highlighting facility 210 may perform selective terminology highlighting in the text by highlighting only key concepts from the user's interest model in the paragraphs that are assessed as most relevant to the user's need.

In one embodiment the information highlighting facility 210 receives the list of URLs from the Search engine or other Web service and begins to download documents 214 identified via browser 217 in the background (while the user is performing other tasks, like reading the result list, etc.) in order to perform the linguistic and statistical analysis of the document texts. MS Read then re-ranks the documents with respect to their relevance to the user's interest model, a more comprehensive representation of the user's interest than the one presented by the user to the Search or some other Web service 212.

In one embodiment, information highlighting facility 210 performs document analysis without a need for downloading and analyzing the document text in advance or in the background. This is done based on simple text analysis that requires no significant overhead in the processing time than is required to download and display the document. In still a further embodiment, other document analysis can be performed in the background as represented by line 245 in FIG. 2A. This analysis may be more involved and require each document to be downloaded. Both approaches can be used to support entity extraction and relation finding, document summarization, etc.

In the case that the user engages in browsing through Web documents the user can either specify an existing context, i.e., a model of the user's interest or need that information highlighting facility 210 created previously or can initiate a creation of the new one by providing information to the information highlighting facility 210 in various forms, including but not limited to a description of a particular topic interest, preferences, intentions and purpose of the browsing task, etc. Information highlighting facility 210 then creates the appropriate user's interest model as described above and applies them to the documents as the user browses the Web. In one embodiment, the information highlighting facility 210 downloads in the background the documents that are pointed to by the hyperlinks in the currently viewed document. These documents are analyzed with respect to the current model of the user's interest. The result of the analysis is information to the user about the relevance of the hyperlinks and suggestion for further steps in browsing. In other embodiments the hyperlink analysis is performed by the information highlighting facility 210 based on the text in the current document that surrounds the hyperlinks, thus without the need to download the linked documents in the background.

Analyses performed by the information highlighting facility 210 can be performed locally, using the local information resources as needed (linguistic resources such as lexicons, dictionaries, knowledge base, etc.) or remotely or as a combination of the two. The types of analyses include but are not limited to:

Terminology marking. When a document is downloaded, the terminology describing the user model can be highlighted, for example, by making keywords and key phrases bolder than the surrounding text, or by changing the background color to facilitate easier spotting in the text. In one embodiment this type of terminology marking can be done at the time the document is downloaded. In another embodiment, a more sophisticated terminology marking is provided by pre-fetching and analyzing the document text in the background (e.g., while the user is performing other tasks, such as reading the document titles in the result sets of the search engines).

Scrolling. When a document is downloaded, it can be scrolled, for example, to the most relevant portion of a multi-page document. This can be done, for example, by statistical and linguistic analysis of the text that involves scoring individual paragraphs or subparts of the document with respect to the user model. Alternatively, it may be based on a simple statistical analysis of the occurrences of terminology from the user's interest model in the text at the time the document is being downloaded, thus with no need for pre-fetching the document text.

Re-ranking. The list of documents provided by one or more search engines may be re-ranked based on relevance ranking and based on a representation of the user's need. The re-ranking may be based on but not restricted to the analysis of information from the summaries provided by the search engines or by pre-fetching the document text and performing additional relevance assessment. This analysis may range from simple pattern matching of the document text and the terminology in the user model to deeper linguistic and statistical analyses and relevance scoring of the document texts.

Document Thumbnailing. Based on a downloaded document, a thumbnail image of the document may be created with or without highlighting of various information found in the document text (e.g., the user query term, the expanded model of the user need, most salient sentences in the text, etc.). Links from the thumbnail image to the document text could be provided to enable easy browsing through the document. By providing visual cues, the thumbnail image of a document provides assistance is assessing the relevance of the whole or parts of the document.

Summarization. A summary of the document text can be provided by but is not restricted to extracting salient sentences from the text as identified, for example, by pattern matching with the terminology of the user's interest model or by a deeper linguistic and statistical analysis of the document text. In one embodiment, the summaries are generated based on various entities and entity relations found in the text, related to or independent from the current user's interest model.

Link analysis. The internal and external links on a web page can be assessed by, for example, downloading the text of the linked documents in the background and assessing their utility with respect to the user model. Such information may be communicated to the user as an aid in deciding whether or not to follow the links.

Figure 3:
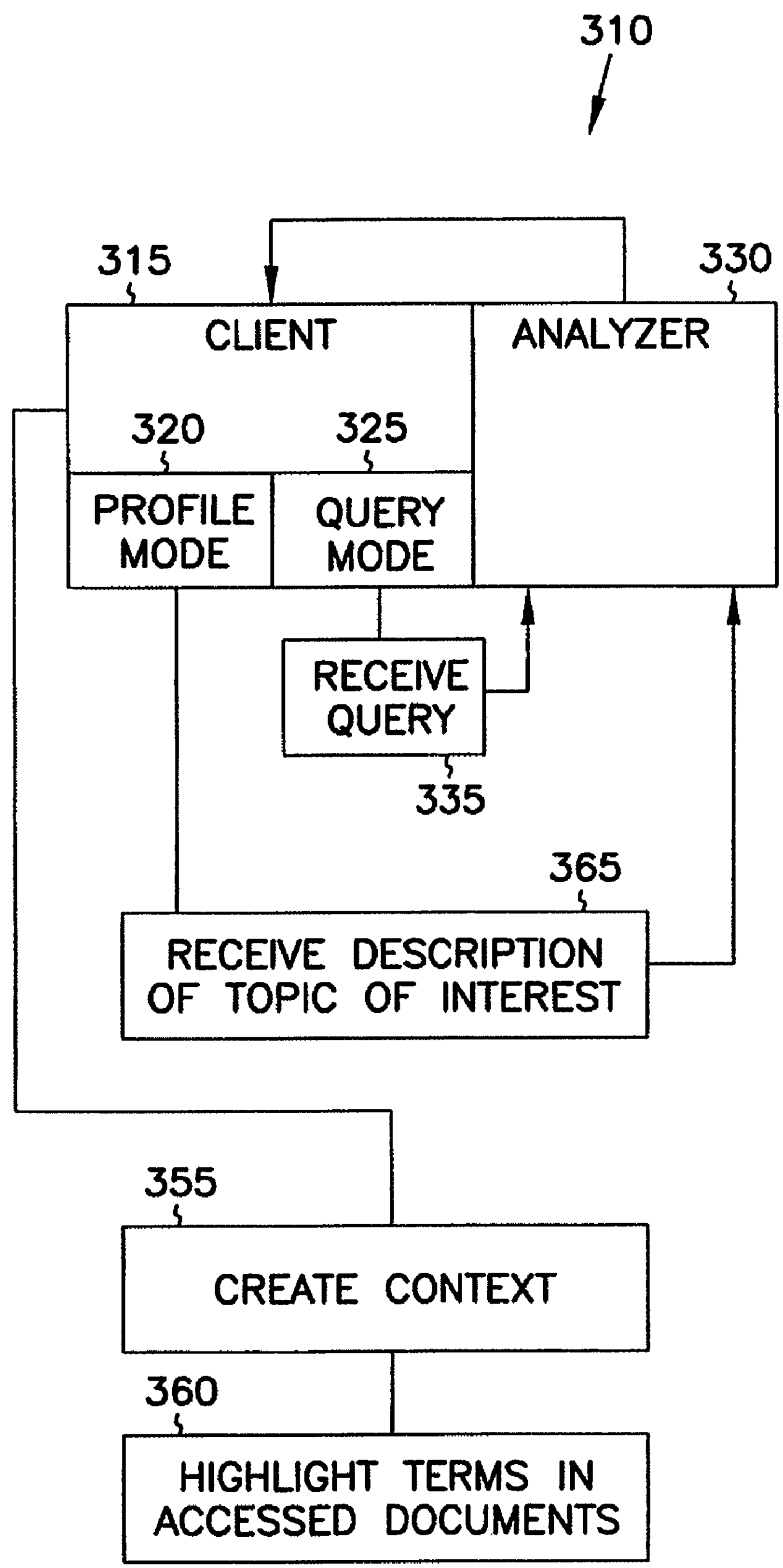
FIG. 3 is a flow diagram showing the flow of creation of a context and its application to documents to provide highlighting.

In FIG. 3, a terminology highlighting or marking facility, which is one of the features of the information highlighting facility 210 is indicated generally at 310. The terminology highlighting facility consists of a client component 315 (i.e., highlighter) that can be an independent application or part of a browser. The highlighter operates in one of two modes: query mode 325 and profile mode 320. The highlighting facility also consists of an analyzer 330.

In the query mode, when a query is issued, the highlighter captures the query at 335 (such as from the search window on the search engines web page) as entered by the user and sends it to the analyzer 330 for syntactic analysis and semantic expansion.

Note that instead of capturing the query from the search engine page the highlighting application can provide a separate window or a search box for typing in the query. That query could then be sent to any search engine. The advantage of this approach is that the user need not retype the query if the user wants to use services of different search engines or other Web services in general.

The query analyzer 330 is a (local or remote) service that takes the query term or any other short description on a topic as input, and returns an augmented set of terms to the client as a result. The query term analysis is completely independent of the actual search and can be processed in parallel while the search engine is processing the query. In one embodiment, the analyzer is implemented as a remote service that accepts terms for analysis via a network connection.

The original query terms and the augmented set of terms together represent the query context as indicated at 355. The system also makes association between the result page and the query context in order to ensure the original query is used for default highlighting until the user explicitly changes the context. When the user browses the Web within this query context (by choosing one of the links that represents a document found by the search engine), the corresponding terms are highlighted in the accessed document at 360.

Note that there can be any number of active contexts stored in the terminology highlighter. The association between the result page and the original query may be used to enforce the default highlighting of all the documents on the result list. For instance, if a user returns to the result page of a previous query, the terms of that query context will be highlighted if a document is browsed to from the result page. Additionally, terms of one context can be applied to and highlighted within documents of a different query context, and new contexts can be constructed by combining terms of other contexts (for example the terms of several related queries can be combined or merged to build a new context).

In the profile mode 320, the user can provide (e.g., by means of a dialog box) a description of the topic of interest at 365 which is then analyzed at 330 analogously to the user's query to provide an augmented set of profile terms. This set of profile terms may be created in parallel with other activities that the user may perform and is then used as a basis for highlighting 360 of all subsequent documents that the user accesses either in real time, or as a background task. The model of the user's interest may also be used as a basis for highlighting 360.

Figure 4:
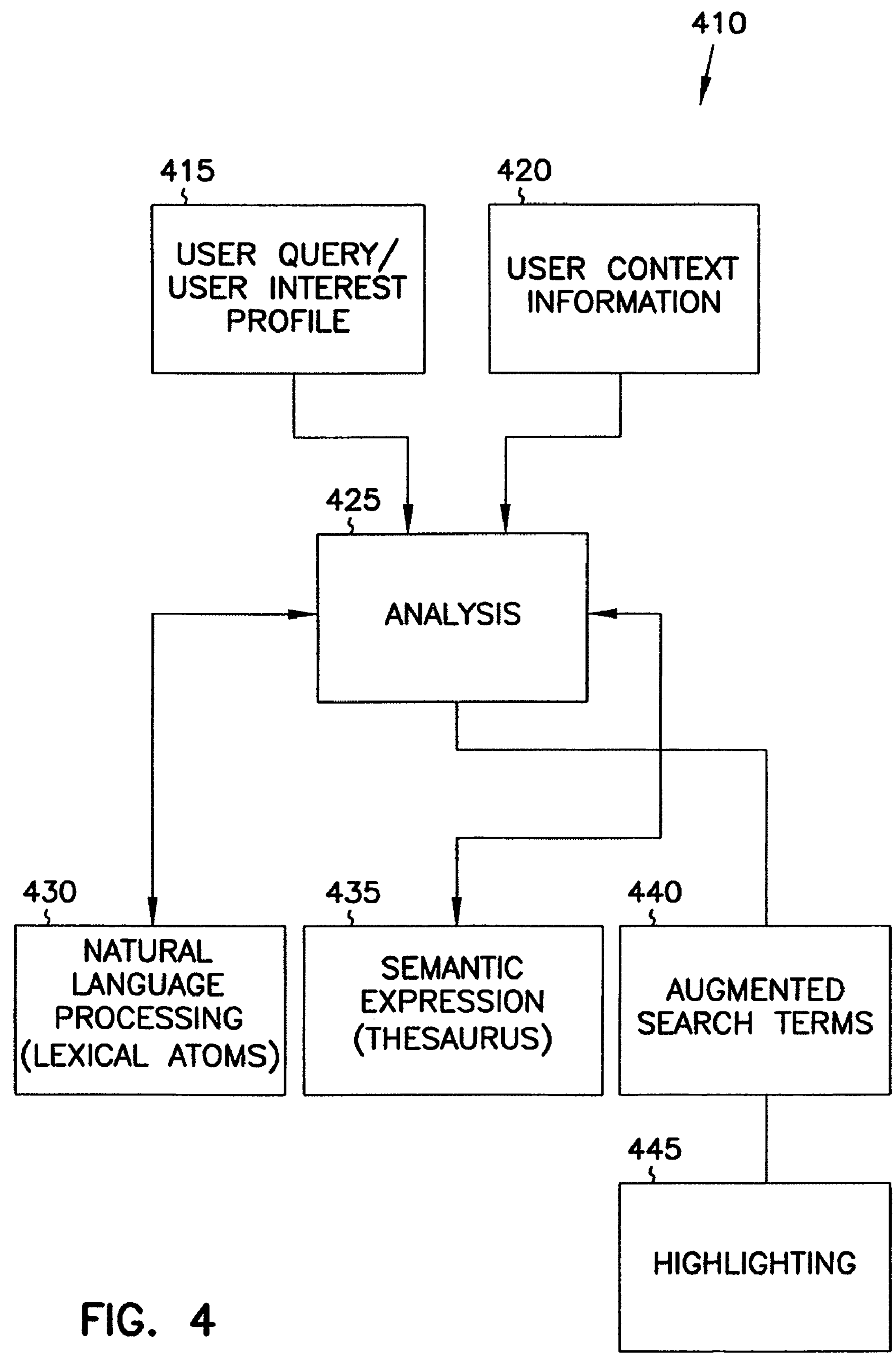
FIG. 4 is a block diagram showing components involved in providing augmented search terms and highlighting.

In FIG. 4 a block diagram shows components involved in providing augmented search terms and highlighting generally at 410. A user query (in the search mode) or the description of the user's interest (e.g., in the browsing mode) is represented at 415 and is generated by a user for sending to a search engine or providing to the read system as an interest profile. The query may be created on a search engine page, or may also be created on the client side in a separate window or search box, and then sent to the search engine. User context information is gathered at 420, and comprises an analysis of the tasks that a user is performing, and analysis of other searches or interest profiles that appear to be related. An analysis engine receives the query and context information, and (in one embodiment) uses natural language processing at 430 and semantic expansion at 435 to provide a model of the user's interest, which in one embodiment may be a set of augmented search terms 440 or a user interest profile. Highlighting of text is then performed at 445 based on the model 440, in one embodiment by selecting a bright background color for all terms found in the document. When used to mark or highlight portions of the document, the model provides the ability to better identify text which is more relevant to the actual intent of the user. Several different types of additional highlighting are described with reference to further figures below. In one embodiment the document text is accessed and analyzed statistically and linguistically. This analysis enables more sophisticated highlighting methods. For example, highlighting of terms that play a role of a subject or object in the query or profile description is more effective for reading a document than highlighting in the document all the concepts that appear in the query or the profile description. Similarly, query and interest profile terms could be highlighted in the document text only if they appear to have a specific linguistic role, e.g., the role of a subject or object.

Figure 5:
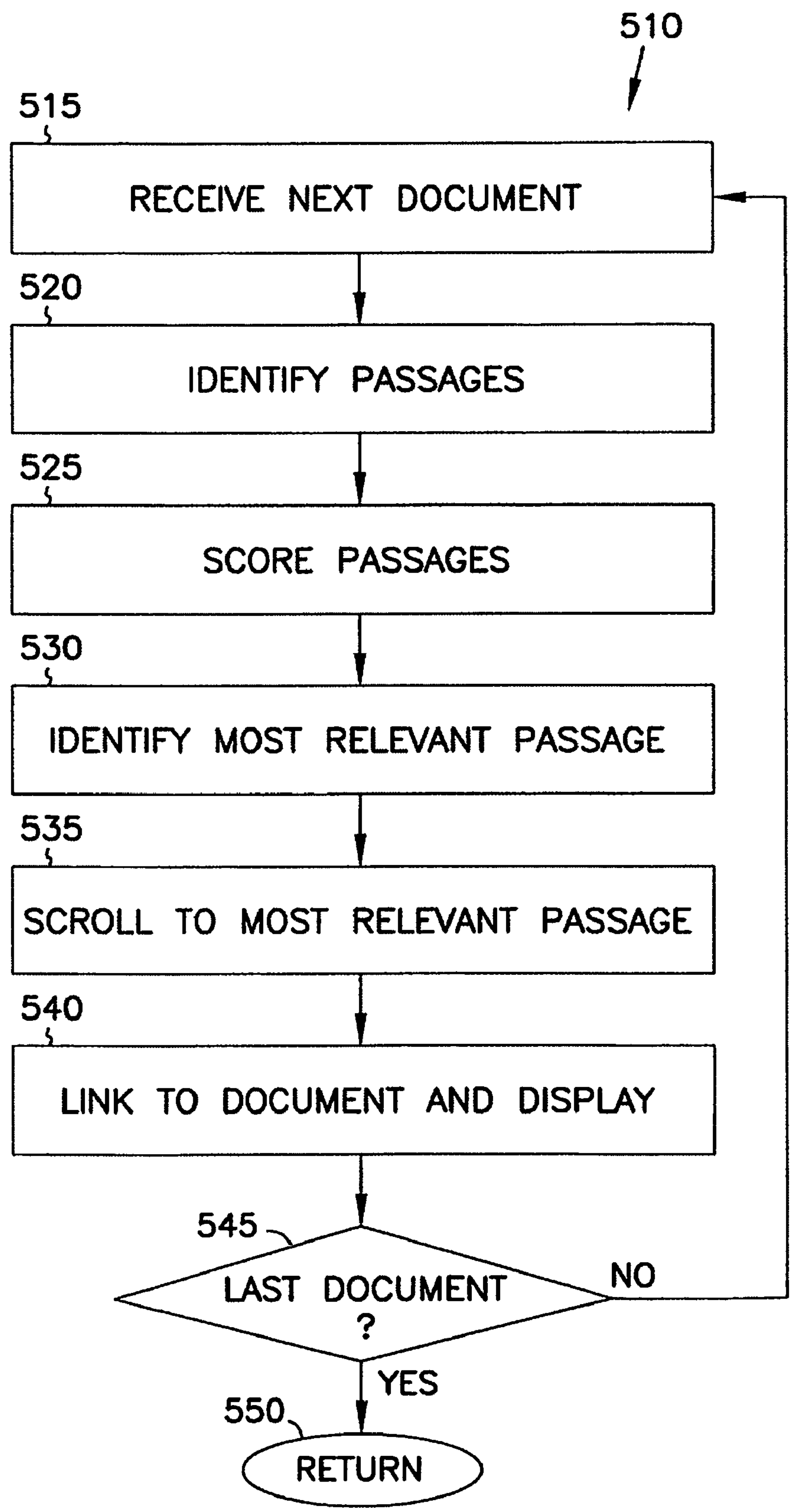
FIG. 5 is a flow diagram showing scrolling of a document to its most relevant portion.

In FIG. 5, a flow diagram indicated generally at 510 shows scrolling of a document to its most relevant portion based on the analysis of the document text. A next document identified in search results or accessed by browsing is received at 515. Subparts of the document are identified at 520. The subparts may be passages, sentences, lines, or paragraphs, all of a desired length or the length determined based on the distribution of query terms in the text. The subparts may in fact overlap if desired. Each of the subparts is then scored at 525 in one of several well known relevance matching function with respect to the model of the user's interest. Statistics from any reference corpus can be used for that purpose. The scoring may also be similar to that used by the search engine, but may also include the use of the model to give a better indication of relevancy. Further, a best portion of the document may be identified by combining consecutive paragraph scores or applying another method, such as (in one embodiment) a Hidden Markov Model (well known in the art) to identify the best passage at 530. At 535, the document is scrolled to the most relevant passage as identified above. The most relevant passage may be scrolled to in the actual document, or may be part of a list of passages which are provided with a link at 540 to corresponding documents. This provides a document list showing the most relevant passage of each document to enable the user to determine which document may be most relevant. If the later, decision block 545 determines whether the document received was the last document in the search results, or selected portion of search results for this function. If not, the next document is received at 515, and its most relevant portion identified. If it was the last document, control is returned at 550.

In one embodiment the scrolling of the document is based purely on the pattern matching of the document text with the query or model of the user's interest. For example, the document is automatically scrolled to the first occurrence in the text of an important concept in the query or model. Further, the document can be scrolled to the paragraph with the highest density of the query or correlation with the model of the user's interest. These document scrolling methods do not require accessing and analyzing document text in advance.

Figure 6:
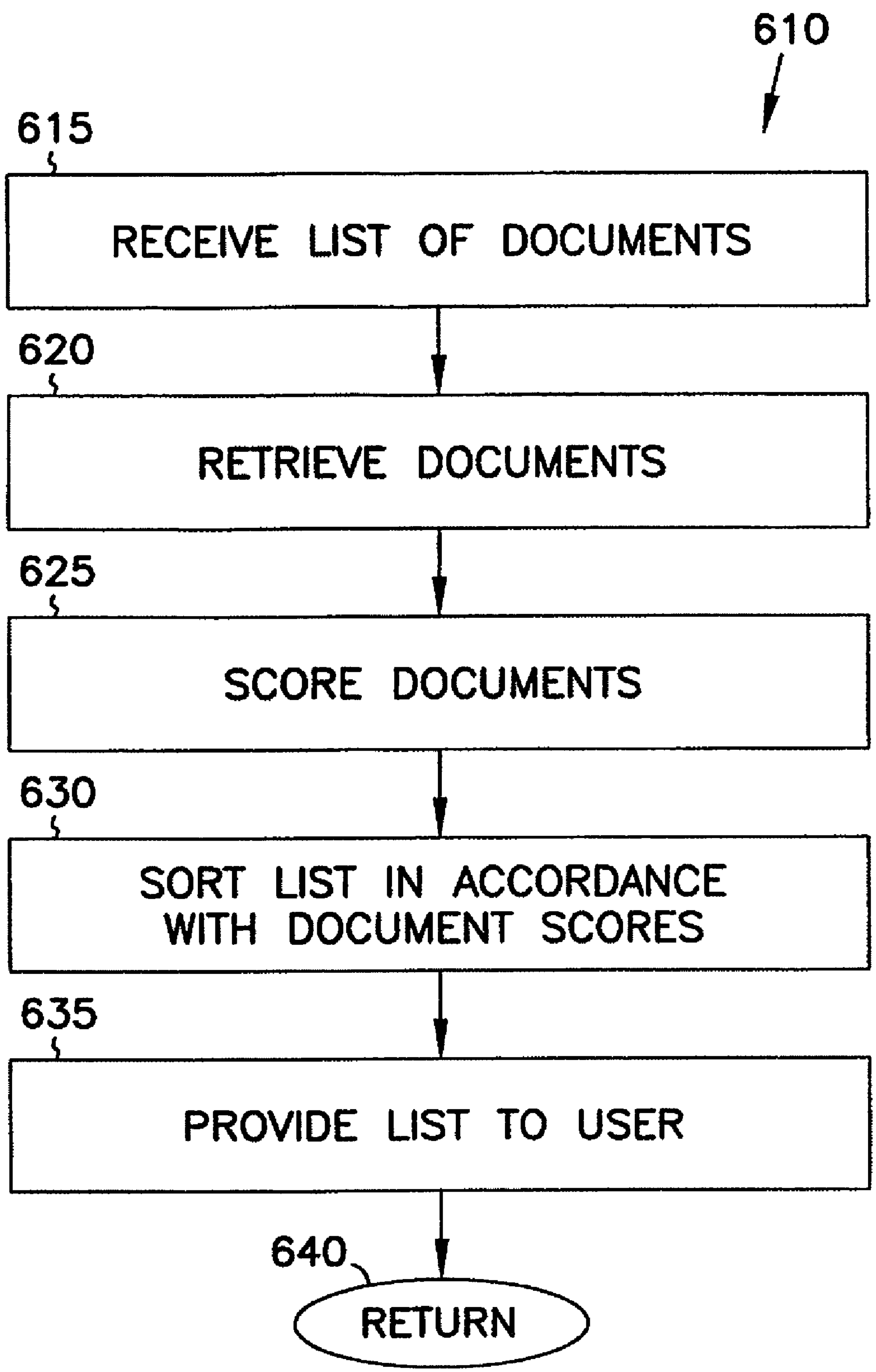
FIG. 6 is a flow diagram showing re-ranking of documents provided by a search engine.

In FIG. 6, a flow diagram indicated generally at 610 shows re-ranking of a list of documents provided by a search engine or the documents that are linked to the currently viewed document via hyperlinks. In the search mode, the list of documents is received at 615, and the top N documents referred to as best hits by the search engine are accessed from the respective servers at 620, as a background task while the user may be looking at the list, or performing other tasks. N may range from 2 to as many as resource constraints permit. N is 30 in one embodiment. The entire document, or some number (K) of pages of the document may be used. Each document may then be scored at 625 in its entirety or similarly to the portion scoring as described previously using a relevance matching method. The scoring may be based on the model, including at least augmented search terms and linguistic analysis of the document text. The list of documents is then sorted in accordance with the document scores at 630. An alternative rank of each of the documents can be provided, or a new list of less than N provided. The list is then provided to the user at 635, and control is returned at 640.

In the browsing mode, the list of documents received at 615 represent all the document linked to the currently viewed document. The documents are accessed from the respective servers at 620 in the background and scored at 625 for relevance with respect to the model of the user's interest that the current document may be associated with. The resulting score for each linked document is then displayed in relation to the document link on the current page and serves as a guide for following the links if desired.

Figure 7:
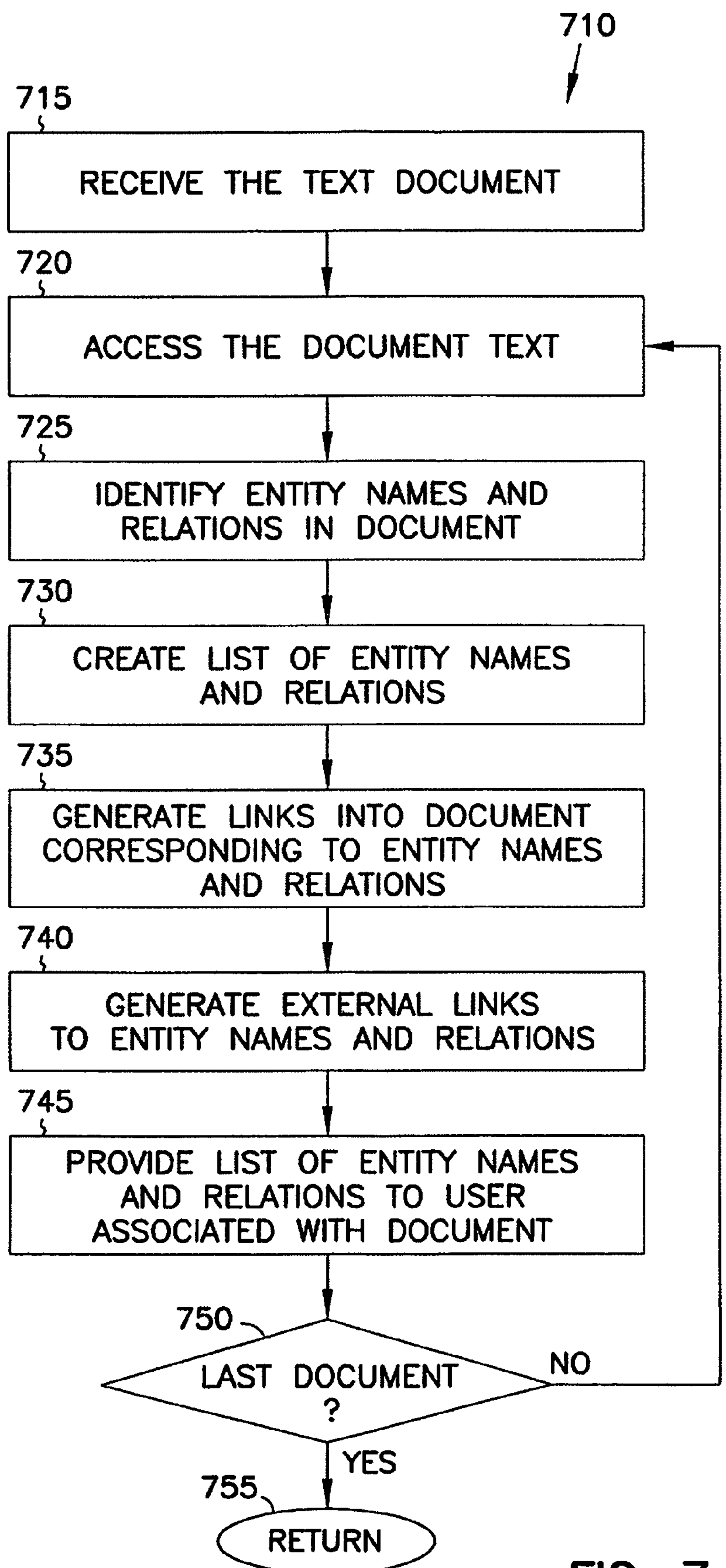
FIG. 7 is a flow diagram showing the identification and provision of a list of names associated with a document.

In FIG. 7, a flow diagram indicated generally at 710 shows identification and provision of a list of entities (such as names associated with a document) and relations among entities in a document. A document is received at 715, and documents are downloaded at 720. Heuristics for identifying entity names and relations among entities (e.g., for person names that may include recognizing titles, capitalization, position and function in the sentence, etc.) combined with lexicon lookups, are then applied to identify entity names and relations in the document at 725. A list of entity names and relations is created at 730. At 735, links into the document corresponding to the entity names and relations are provided. In one embodiment, the list of extracted entities is displayed in a separate window, and each entity is supplied with navigational features, such as an up and down arrow to navigate to next and previous occurrences of the entity in the document. Information about the particular entity or entity relation may be extracted from additional resources at 740. For example, if the entity is a company name, appropriate information services providing information about such entities can be used to supply a link to the web site of the particular company. If the entity is a person name, the user may be able to access a person's web site using appropriate information services, or if the person is a publicly known figure, the latest information available from the press. Similarly, if two entities, for example a person with the name N and a company with the name C are connected through the relationship "N is the President of C" the system can provide the link to the pages where the person N is mentioned as the President of C. This feature may apply to a variety of entities, such as geographical features, countries, trademarks, etc. and typical or important relations among such entities. The list of entity names and relations with links is provided to the user at 745, and if the last document has been processed at 750, control is returned at 755. This process may be applied to a selected number of documents, or may continue in the background as long as is desired, or until the context is switched.

Figure 8:
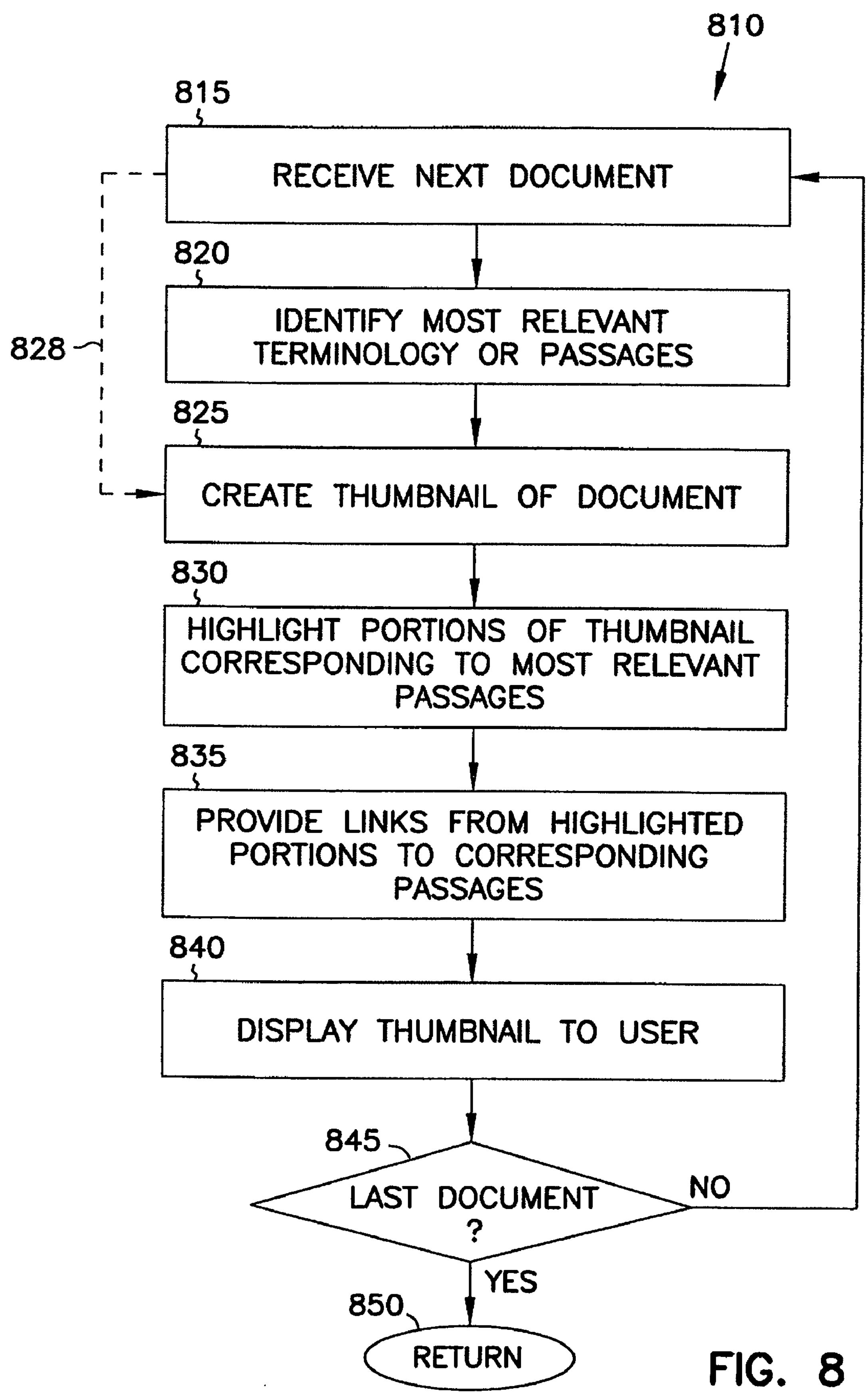
FIG. 8 is a flow diagram showing the creation of a thumbnail of a document with highlighting.

In FIG. 8, a flow diagram indicated generally at 810 shows creation of a thumbnail of a document with highlighting. A next document is received through browsing or downloaded at 815 from the list of documents provided by a search engine. If the accessed document can be viewed as a single screen document (of some default size, for example) a thumbnail of the whole document is created. On the Web the concept of a page is different from traditional paper documents. The size of a page can be a fixed size specified by the user or the system, or can be based on the size of the window used to view the document. For multi-page documents the most relevant passages can be found at 820, and a thumbnail of the page contain the best passage created at 825.

The thumbnail appears as a single sheet of paper and may either relate to the first page of a document, or some scaled version or abstract representation of the document. Larger documents may even be displayed as a stack of thumbnails with navigation there between. As an alternative, the thumbnail of multi-page documents can be created at 825 without identifying the most relevant passages as represented by broken line 828. Instead, the thumbnail may be an abstract representation of the whole document in the form of a fixed length page partitioned into blocks that corresponds to pages. They can be colored to reflect the presence of important terminology in the particular part of the document. For example, the color of the particular block can be related to the color used to highlight the most prominent term in that part of the document. The result of this approach is a thumbnail filled with the spectrum of colored blocks that visualize the relevance of each part of the document.

At 830, portions of the thumbnail corresponding to the most relevant passages are highlighted. Portions may also be highlighted without assessing the relevance of the passages. Links are then provided at 835 from the highlighted portions to the corresponding passages or portions of the document. The thumbnail is then displayed to the user at 840, and the process is repeated based on decision block 845 for a selected number of documents. Control is returned at 850.

In one embodiment the thumbnail highlighting is based on the pattern matching of the query terms or interest profile terms without deeper linguistic analysis of the document text and identification of relevant passages. Generally, thumbnail highlighting can be done with respect to any information about the user's interest or information extracted from the document.

Figure 9:
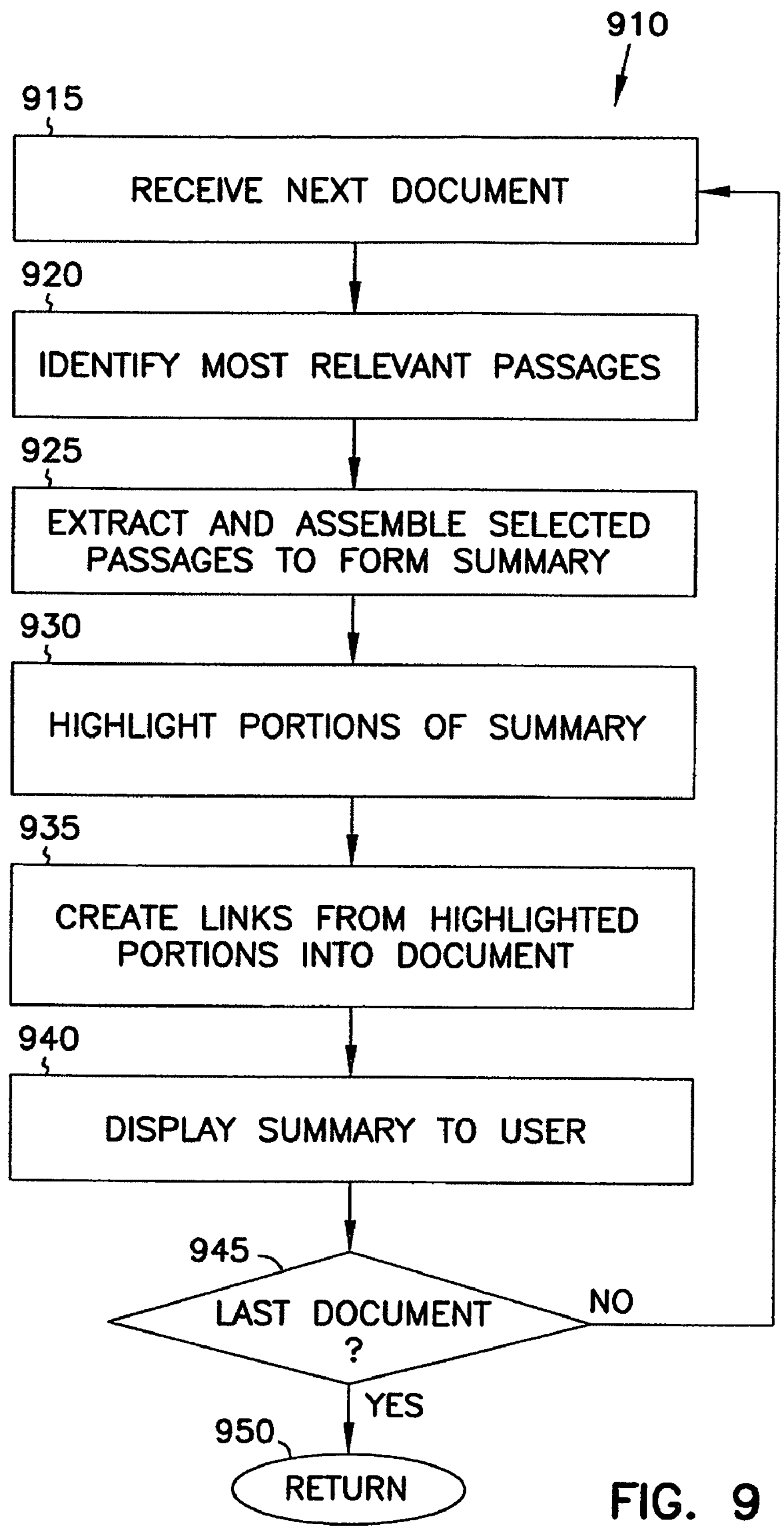
FIG. 9 is a flow diagram showing the creation of a summary of a document.

In FIG. 9, a flow diagram indicated generally at 910 shows creation of a summary of a document. A next document is received at 915, and the most relevant passages with respect to the model which may include the query (in the search mode) or interest profile (in the browsing mode) or independent from the current user's context are identified at 920 as previously described. Selected passages are then extracted and assembled to form a summary at 925. In this embodiment, the summaries are created by extracting sentences from the text that contain prominent query terminology. The summary may also be limited to a predetermined length, with the most relevant passages or sentences being used first.

Portions of the summary are highlighted at 930, and links are created therefrom to corresponding portions of the document at 935. The summary is then displayed to the user at 940, and further documents are processed in the same manner based on decision block 945. Control is returned at 950.

CONCLUSION

A highlighting facility on a computer provides information to a user to independently assist the user in evaluating the relevance of documents identified by a search engine or some other information providing service in response to a user query or the relevance of documents accessed in a browsing mode in relation to a particular user's interest. When accessing documents identified as relevant by the information providing service or in the browsing mode from other networked computers, the facility determines why a document may be of interest, and provides information or highlighting to assist the user in determining whether the document is desired.

An important characteristic of the Web is a separation of data gathering and indexing from information delivery and presentation. The information highlighting facility deals with the presentation and information highlighting of documents to facilitate reading, comprehension, and assimilation of information found in the accessed documents. Information highlighting is independent of the search, and thus searches from multiple different search engines can be relevance assessed and ranked together in a consistent manner. By providing the highlighting based on actual retrieved documents, up to date versions of the documents are assured. The facility may base relevancy of a retrieved document on the original query, or a model of the user's interest, which may include an augmented set of search terms or enhanced version of the query which takes into account the general interest of the user as captured by an interest profile and context of use of the computer by the user, or a combination thereof. This provides a consistent and enhanced ability to correctly identify relevance of each document, rather than rely on the search engine basing relevance purely on a single query.

Linguistic analysis and semantic expansion to provide the augmented version or set of terms is done in parallel with the execution of the query by one or more search engines to provide relevance more quickly. The model of the user's interest is then applied by the facility to documents as they are accessed through a browser to provide highlighting of relevant portions of the document. The model can be thought of as an interest profile context, or representation of the user's information need. When browsing the web within this context or session, the corresponding terms are highlighted in the accessed documents.

The facility may also be run as a remote service on a powerful computer (in contrast to the possibly less powerful local computers use by the user to further speed up processing and minimize delays. The remote service computer may in fact have a much higher bandwidth connection to the network, and be able to process many documents while the user is still considering the list of documents returned by the search engine or some other information providing service.

Documents may be scrolled to the most relevant portion of a multi-page document based on pattern matching of the document text with the query or interest profile terms or by relevance scoring of individual paragraphs or subparts of the document based on the model. The list of documents provided by one or more search engines may also be re-ranked based on relevance ranking and based on a representation of the user's need. The re-ranking may be based on summaries provided by the search engines, or by actually retrieving the documents and either pattern matching with the augmented terms or performing a deeper linguistic and statistical analysis of the document text, or based on the model and assessing the document relevance to the query.

Information, such as names of entities (e.g., the person's or a company name) and the relations among the entities may be extracted using well known heuristics and lexicon lookups, and provided as a list, linked back into the document. For such names and relations, external links can also be found by local lookup or query and provided to the user. Further, based on the downloaded documents, thumbnails of the documents may be created with highlighting corresponding to the most relevant portions of the documents. Links to the document are provided within the thumbnail based on the highlighting or discrete portions within the thumbnail corresponding to the relevant portions of the document. The thumbnail provides a visual representation of the relevance of the entire document and allows the user to quickly identify an area of the document to help determine its relevance.

A summary of the document text can be provided by extracting salient sentences from the text as identified by pattern matching with the augmented terms or a deeper linguistic and statistical analysis of the document text, or based on the model. Summaries can also be generated based on important entities and entity relations found in the text, related to or independent from the current user's interest or query context. In a browsing mode, the internal and external links on a web page currently viewed can be assessed by downloading the text of linked documents in the background and assessing their relevance to the user's need and interest. Such information may be communicated to the user as an aid in deciding whether or not to follow the links.

These different ways of providing relevance information can be divided into categories based on whether they require analysis of the target documents or not. Some can be effectively implemented based on a very shallow analysis of the document text, practically by pattern matching without having to access the document in advance. These include highlighting, scrolling and thumbnail creation and highlighting. Some ways are better implemented by downloading the document text and providing a deeper linguistic analysis of the text. These include more sophisticated document highlighting, scrolling and thumbnail highlighting, entity extraction and entity relation finding, summarization of documents, re-ranking of the retrieved documents and assessment of hyperlinks in the documents.

The model of the user's interest may also vary across a broad spectrum from simple to more detailed. The original user's description of the query may be used in one embodiment. Further variations include using the augmented query, an original description of the interest profile, an enhanced description of the interest profile, general interest profiles which are not user specific, but are selected from some topical hierarchy—a library of topic profiles, and query/interest profile combined with information about the user's task.

In the present invention, document presentation and document analysis features within a distributed computer network environment are provided where document gathering, indexing and relevance assessment with respect to a user's query is independent from document delivery and presentation to the user. The user's need is separated from the search strategy. In other words, the user's query and interest profile are modeled independently from search activities such as by applying linguistic analysis. Further, support for relevance assessment is provided in both the search and browsing modes. The user interest model is applied to view and analyze documents that are accessed as a result of the search activity or by browsing Web documents.

This application is intended to cover any adaptations or variations of the present invention. It is manifestly intended that this invention be limited only by the claims and equivalents thereof.

What is claimed is:

1. A computer implemented method of enhancing query results provided independent of a search engine, the method comprising:

sending a query to an independent search engine;

create a context based at least in part upon a user model;

receiving query results from the search engine;

retrieving at least one document identifying by the query results;

displaying the at least one document;

identifying at least one name of a person or a company within the at least one document;

generating a list of the at least one name of a person or company in a separate window from the at least one document, wherein each name is provide with features to navigate to occurrences of the name in the at least one document;

dividing the document into sections, and generating a relevancy score for each section based upon the context; and automatically scrolling to a section of the document with a highest relevancy score.

2. The method of claim 1, each section is one of a paragraph, a sentence, and a predetermined number of lines of text.

3. The method of claim 1, wherein the at least one name includes a name of at least one person and a name of at least one company.

4. The method of claim 3, identifying a relationship between the at least one person and the at least one company.

5. The method of claim 4, providing links to pages including the name of the at least one person and the name of the at least one company mentioned in the identified relationship.

6. A system embodied on a computer readable storage medium for enhancing query results provided independent of a search engine, the system comprising:

a module that sends a query to a search engine separate from the computer;

a module that receives query results from the search engine;

a module that retrieves documents identified by the query results;

a module that enhances the query based at least in part upon a user model;

a module that applies the enhanced query to the retrieved documents; and a module that generated information regarding relevancy of the retrieved documents based at least in part upon the enhanced query and the user model, wherein a name of a person and name of a company are identified with the retrieved documents and a relationship between the person and company is identified, the module that generates information regarding relevancy provides links to retrieved documents that contain the name of the person and the name of the company mentioned in the identified relationship.

7. The system of claim 6, the query is enhanced based on at least one of linguistic analysis, a general interest profile, a model of user interest generated independent of search result.

8. The method of claim 7, the linguistic analysis comprises at least one of syntactic and semantic analysis.

9. The system of claim 6, further containing a module that re-ranks the query results based on information contained in the retrieved documents and upon the user model.

10. The system of claim 6, further containing a module that automatically scrolls to a most relevant portion of a retrieved document based at least in part upon the user model.

* * * * *